United States Patent Office 3,162,681
Patented Dec. 22, 1964

3,162,681
o-BIS - (2 - CHLOROETHYL) - AMINOPHENYLAL-
ANINE AND METHOD OF PREPARING SAME
Thomas Anthony Connors, London, and Walter Charles
Joseph Ross, Sunbury-on-Thames, England, assignors
to National Research Development Corporation, London, England, a British corporation
No Drawing. Filed Mar. 24, 1961, Ser. No. 98,009
Claims priority, application Great Britain, Apr. 4, 1960,
11,874/60
5 Claims. (Cl. 260—518)

This invention relates to chemotherapeutic agents and has as an object to provide a new compound having tumour growth inhibitory action, and a process for the manufacture thereof.

British specification No. 750,155 describes and claims p-bis-(2-chloroethyl)-aminophenylalanine and a process for its preparation. This compound in the L form, the D form and the racemic form was found to have tumour growth inhibitory action.

It has been found according to this invention that o-bis-(2-chloroethyl)-aminophenylalanine has greater activity as a tumour growth inhibitor than either the m or p-isomer or in fact any hitherto known "aromatic nitrogen mustard" when given at a comparable dose.

Accordingly, the present invention provides the novel compound o-bis-(2-chloroethyl)-aminophenylalanine (I).

It will be understood that the present invention extends to the D and L forms as well as the racemic or DL form of the novel compound.

It was further found that the methods used for the synthesis of the m- and p-isomers are not applicable to the preparation of the o-isomer since unwanted cyclic intermediates are formed instead of the required compound.

It was therefore necessary to devise a completely novel route for the preparation of the compound of this invention.

Accordingly, the present invention also includes a process for the manufacture of o-bis-(2-chloroethyl)-aminophenylalanine wherein o-bis-(2-chloroethyl)-aminobenzyl chloride is reacted with a compound of the general formula:

$$CH:(COOR)_2$$
$$NOCOR'$$

wherein R is a lower alkyl group and R' is hydrogen or a lower alkyl group, preferably diethyl acetamidomalonate followed by acid hydrolysis of the ester formed to yield o-bis-(2-chloroethyl)-aminophenylalanine.

The o-bis-(2-chloroethyl)-aminobenzyl chloride may be prepared by heating o-aminobenzyl alcohol with ethylene oxide to form o-bis-(2-hydroxyethyl)-aminobenzyl alcohol and heating this compound with a chlorinating agent, for example phosphorus oxychloride or thionyl chloride, if desired in the presence of an inert solvent to form o-bis-(2-chloroethyl)-aminobenzyl chloride.

The process is illustrated in the following reaction scheme:

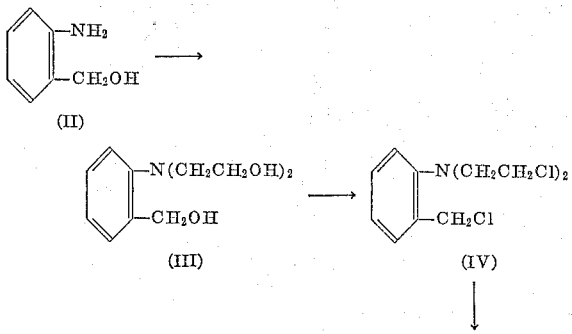

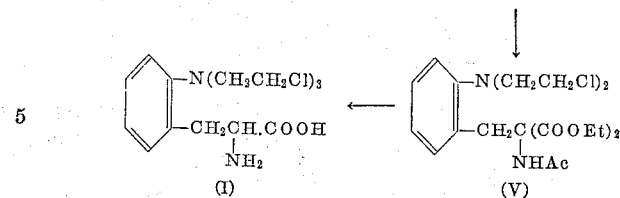

where "Et" means the ethyl radical and "Ac" the acetyl radical.

The following example illustrates the invention:

Example

28 C. of o-aminobenzyl alcohol and 22.5 ml. of ethylene oxide in 28 ml. of benzene were heated at 170–175° C. for 5 hours. The fraction then boiling at 196–200° C./0.05 mm. (36 g.) was the triol (III). (Found: C, 62.6; H, 8.1; N, 6.7. $C_{11}H_{17}NO_3$ requires: C, 62.5; H, 8.1; N, 6.6%.) 7.8 C. of the triol in 25 ml. of benzene and 12 ml. of phosphorus oxychloride was heated at 100° C. for 12 hours. The trichloro compound (3.4 g; IV) had B.P. 142° C./0.01 mm. (Found: C, 50.2; H, 5.4; N, 5.2; Cl, 37.1. $C_{11}H_{14}NCl_3$ requires: C, 49.6; H, 5.3; N, 5.2; Cl, 39.9%.) To 11.6 g. of dry diethyl acetamidomalonate was added a solution of sodium (1.23 g.) in 150 ml. of anhydrous ethanol followed by 14.3 g. of the trichloro compound (IV) in 50 ml. of anhydrous ethanol. After stirring at room temperature for 22 hours the product was isolated and crystallised from light petroleum (B.P. 60–80° C.). The diester (4.1 g.; V) formed needles, M.P. 69–70° C. (Found: C, 53.6; H, 6.1; N, 6.3; Cl, 16.0. $C_{20}H_{28}Cl_2N_2O_5$ requires: C, 53.7; H, 6.3; N, 6.3; Cl, 15.9%.) On heating 1.5 g. of the diester for 2½ hours with 15 ml. of concentrated hydrochloric acid, cooling and then adding sodium acetate, the amino acid (I) separated. It formed rosettes, decomp. 162° C., from ether-acetic acid. Found: C, 51.0; H, 5.9; N, 9.0; Cl, 23.3. $C_{13}H_{18}Cl_2N_2O_2$ requires: C, 51.2; H, 5.9; N, 9.2; Cl. 23.2%.)

The following results show the advantageous tumour inhibiting properties of the compound of the present invention:

Inhibition of the growth of the transplanted Walker rat carcinoma carried out as described by Haddow, Harris, Ken and Roe in Proc. Roy. Soc. A (1948), 241, 147.

$$\frac{\text{Weight of tumours in control series C}}{\text{Weight of tumours in treated series T}}$$

C/T values at a dose of 0.5 mg./kg. in arachis oil
DL-o-bis-(2-chloroethyl)-aminophenylalanine, 30 (thirty)
DL-m-bis-(2-chloroethyl)-aminophenylalanine, 5 (five)
L-p-bis-(2-chloroethyl)-aminophenylalanine, 1 (one)

What we claim is:
1. o-Bis-(2-chloroethyl)-aminophenylalanine.
2. A process for the production of o-bis-(2-chloroethyl)-aminophenylalanine which comprises reacting o-bis-(2-chloroethyl)-aminobenzyl chloride with a substantial equal molecular proportion of a compound of the formula:

$$Na—C:(COOR)_2$$
$$NHCOR'$$

in which R is a lower alkyl group and R' is selected from the group consisting of hydrogen and lower alkyl, subjecting the product to acid hydrolysis and isolating the o-bis-(2-chloroethyl)-aminophenylalanine produced.
3. A process according to claim 2, in which the compound of the formula:

$$CH:(COOR)_2$$
$$NHCOR'$$

is diethyl acetaminodimalonate.

4. A process for the production of o-bis-(2-chloroethyl)-aminophenylalanine which comprises heating together o-aminobenzyl alcohol with ethylene oxide, chlorinating the o-bis-(2-hydroxyethyl)-aminobenzyl alcohol obtained to form o-bis-(2-chlorobenzyl)-aminobenzyl chloride, reacting this product with a substantially equimolecular proportion of a compound of the formula:

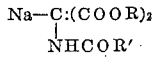

in which R is a lower alkyl group and R' is selected from the group consisting of hydrogen and lower alkyl, subjecting the product to acid hydrolysis and isolating the o-bis-(2-chloroethyl)-amino phenylalanine produced.

5. A process according to claim 4, in which the chlorination is carried out by heating the o-bis-(2-hydroxyethyl)-aminobenzyl alcohol with a chlorinating agent selected from the group consisting of phosphorus oxychloride and thionyl chloride and in the presence of an inert solvent.

References Cited in the file of this patent
UNITED STATES PATENTS

| | | |
|---|---|---|
| 2,601,204 | Campbell | June 17, 1952 |
| 2,840,603 | Mock et al. | June 24, 1958 |
| 2,852,556 | Katz et al. | Sept. 16, 1958 |

FOREIGN PATENTS

| | | |
|---|---|---|
| 750,155 | Great Britain | June 13, 1956 |

OTHER REFERENCES

Finar: Organic Chemistry, pp. 95, 218 and 238 (1959).
Connors et al.: Chem. and Ind. 1960, 495–493.